US008229843B2

(12) United States Patent
Breslin et al.

(10) Patent No.: US 8,229,843 B2
(45) Date of Patent: Jul. 24, 2012

(54) METHOD AND SYSTEM FOR DEBT PROTECTION OR CANCELLATION

(75) Inventors: Jerome Breslin, Iron Station, NC (US); Robert Sunris, Weddington, NC (US); J. Keith Pellerin, Mt. Holly, NC (US); Katharina Mumford, Waxhaw, NC (US); Robert Mauldin, Charlotte, NC (US); David Curren, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1437 days.

(21) Appl. No.: 10/710,206

(22) Filed: Jun. 25, 2004

(65) Prior Publication Data

US 2005/0289044 A1    Dec. 29, 2005

(51) Int. Cl.
*G06Q 40/00* (2012.01)
(52) U.S. Cl. ............................................ 705/38; 705/35
(58) Field of Classification Search ................ 705/4, 38, 705/35
See application file for complete search history.

(56) References Cited

U.S. PATENT DOCUMENTS

| | | | | |
|---|---|---|---|---|
| 4,876,648 | A * | 10/1989 | Lloyd | 705/38 |
| 5,655,085 | A * | 8/1997 | Ryan et al. | 705/4 |
| 5,907,828 | A * | 5/1999 | Meyer et al. | 705/4 |
| 6,009,402 | A * | 12/1999 | Whitworth | 705/4 |
| 7,182,253 | B1 | 2/2007 | Long | |
| 7,440,926 | B2 * | 10/2008 | Harrington | 705/80 |
| 2004/0128233 | A1 * | 7/2004 | Jarzmik | 705/38 |
| 2004/0254878 | A1 | 12/2004 | Fitzsimmons et al. | |
| 2005/0108028 | A1 * | 5/2005 | Arehart | 705/1 |
| 2005/0108064 | A1 * | 5/2005 | Castleman et al. | 705/4 |
| 2009/0216591 | A1 | 8/2009 | Buerger et al. | |
| 2010/0023354 | A1 | 1/2010 | Gore et al. | |
| 2010/0100400 | A1 | 4/2010 | Becerra | |
| 2010/0274593 | A1 | 10/2010 | Dreher | |

OTHER PUBLICATIONS www.bankofamerica.com. Bank of America Cardholder Security Plan. Retrieved Feb. 2008. Archived Jun. 20, 2003.*
Anonymous. Debt Cancellation Program Endorsed. American Bankers Association. ABA Banking Journal. New York: May 2003. vol. 95, Iss. 5; p. 13, 2 pgs.*
www.csc.com. Debt Protection Program. Computer Sciences Corporation. Copyright 2001. Retrieved Feb. 2008. Archived Jun. 20, 2003.*
Jannarone, J. P., (May 30-31, 2002). Debt Protection Product Development in the Aftermath of Gramm-Leach-Bliley. vol. 28, No. 1.*
Keith A Dall. (2002). Goodbye, credit life. Hello, debt cancellation? American Bankers Association. ABA Banking Journal, 94(6), 64-67. Retrieved Oct. 6, 2011.*
David Reich-Hale. (Oct. 20, 2003). B of A: Debt Cancellation Product Equals Credit Life. American Banker,p. 19. Retrieved Mar. 20, 2012.*
Bob Reilley. (Oct. 2001). Debt cancellation: the preferred alternative to credit insurance. ABA Banking Journal, V93, n10, p. 74(4), Retrieved Mar. 20, 2012.*
Dymi, Amilda. WaMu Centralizes Community Outreach. National Mortgage News. NY May 26, 2003. vol. 27, Iss. 35; p. 18.

* cited by examiner

*Primary Examiner* — Charles Kyle
*Assistant Examiner* — Kito R Robinson
(74) *Attorney, Agent, or Firm* — Michael A. Springs; Moore and Van Allen, PLLC; Ryan P. Harris

(57) ABSTRACT

A method for debt protection or cancellation may include providing an addendum for a debt protection or cancellation product for inclusion in a debt instrument. The method may also include serving the debt protection and cancellation product in response to a borrower purchasing the debt protection and cancellation product.

35 Claims, 14 Drawing Sheets

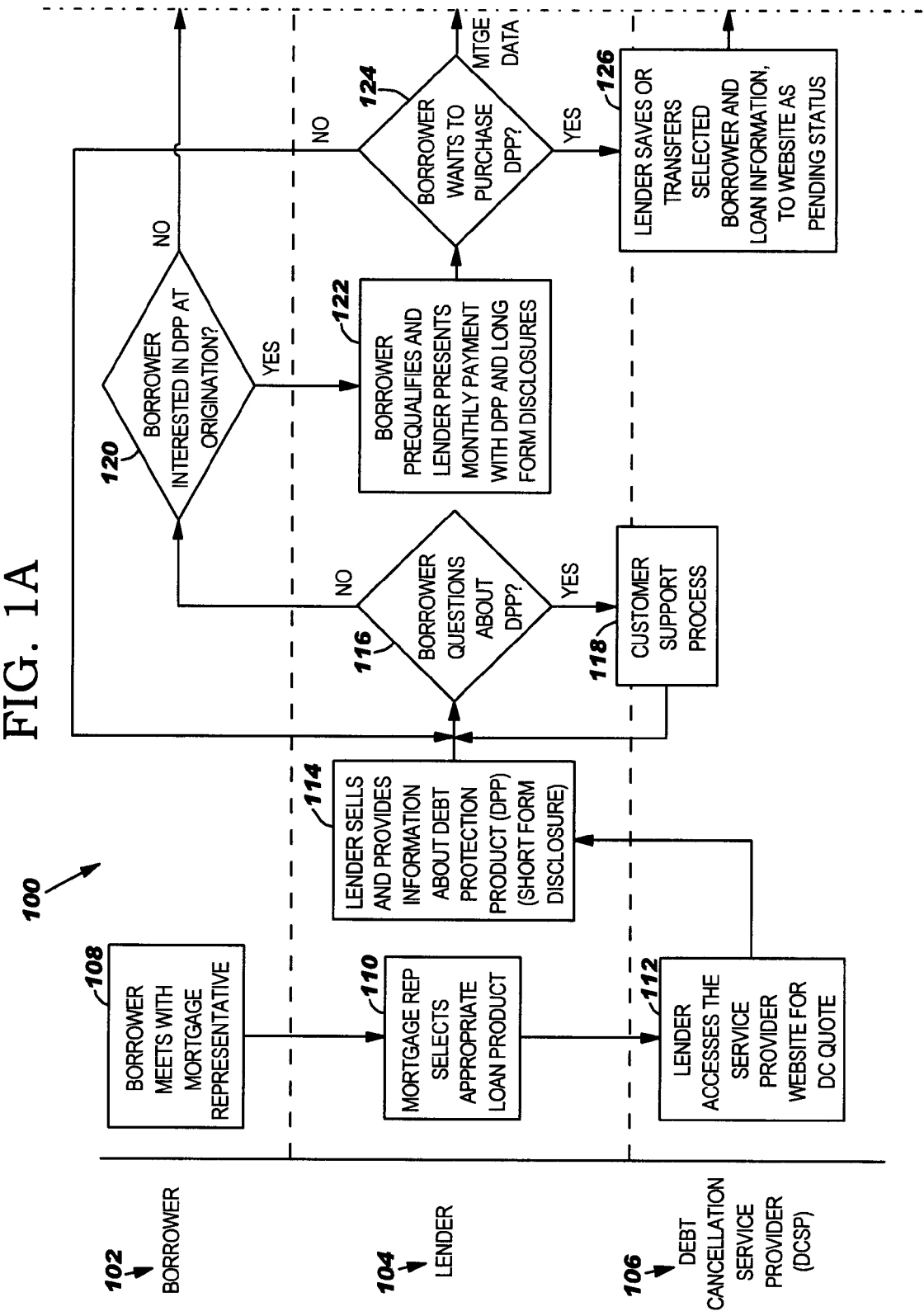

METHOD AND SYSTEM FOR DEBT PROTECTION OR CANCELLATION

BACKGROUND OF INVENTION

The present invention relates to mortgages, financing or debt instruments and more particularly to a method and system for debt protection or cancellation.

Due to economic uncertainty and the likelihood for such uncertainty to continue in the future, mortgagors and other debtors may be interested in protection or cancellation of debt in the event of some occurrence. Examples of such unforeseen occurrences may include disability of the borrower or mortgagor, involuntary unemployment, a legal determination of insolvency, accidental death or the like. Several insurance companies offer credit insurance that will pay off a mortgagor's or debtor's loan in the event of untimely death. Such insurance is known in the industry as credit life and disability insurance and is marketed or sold to mortgagors or debtors after the loan closing. Credit insurance products provide indemnity based benefits that are paid directly to the insured in the event of a claim. Further, the premiums for the insurance policies are often paid in a lump sum at the time of loan closing. Credit insurance products are stand-alone insurance policies and are not an addendum to the promissory note or debt instrument that is executed by the borrower or mortgagor at the time of loan closing. The premium for credit mortgage insurance is generally paid in a lump sum at the time of the loan closing by the borrower and is often added to the mortgage loan balance.

For mortgage borrowers who can only provide 10% down payment on the purchase of real estate, there are numerous companies that provide mortgage insurance. In the event of the borrower's inability ot meet the contractual requirements of the mortgage, this product operates to pay the lending institution the difference between 10% and the 20% down payment required by the secondary mortgage market (generally the Government Sponsored Entities such as Fannie Mae or Freddie Mac). In this event, the lending institution becomes the beneficiary of the mortgage insurance policy and there is no agreement or obligation of the lending institution to waive further payment of the debt or to cancel the debt. Rather, the lending institution is paid out of the proceeds of the mortgage insurance policy to settle the debt.

SUMMARY OF INVENTION

In accordance with an embodiment of the present invention, a method for debt protection or cancellation may include offering a borrower or mortgagor a debt protection or cancellation product associated with a loan. Periodic fees may be collected in response to the borrower accepting or purchasing the debt protection or cancellation product. The loan may be cancelled and the periodic fees waived in response to a triggering event.

In accordance with another embodiment of the present invention, a method for debt protection or cancellation may include providing an addendum for a debt protection or cancellation product for inclusion in a debt instrument or note. The debt protection or cancellation product may be serviced in response to a borrower or mortgagor purchasing the debt protection and cancellation product.

In accordance with another embodiment of the present invention, a system for debt protection or cancellation may include a server and a debt protection or cancellation program operable on the server to provide a debt protection or cancellation product offerable in association with a loan or debt instrument.

In accordance with another embodiment of the present invention, a system for debt protection or cancellation may include means for providing an addendum for a debt protection or cancellation product for inclusion in a debt instrument. The system may also include means for servicing the debt protection or cancellation product in response to a borrower or mortgagor purchasing the debt protection or cancellation product.

In accordance with another embodiment of the present invention, a computer-readable medium having computer-executable instructions for performing a method that may include providing an addendum for a debt protection or cancellation product for inclusion in a debt instrument. The method may also include servicing the debt protection or cancellation product in response to a borrower purchasing the debt protection or cancellation product.

BRIEF DESCRIPTION OF DRAWINGS

FIGS. 1A, 1B, 1C and 1D (collectively, FIG. 1) are a flow chart of a method for debt protection or cancellation in accordance with an embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1B:
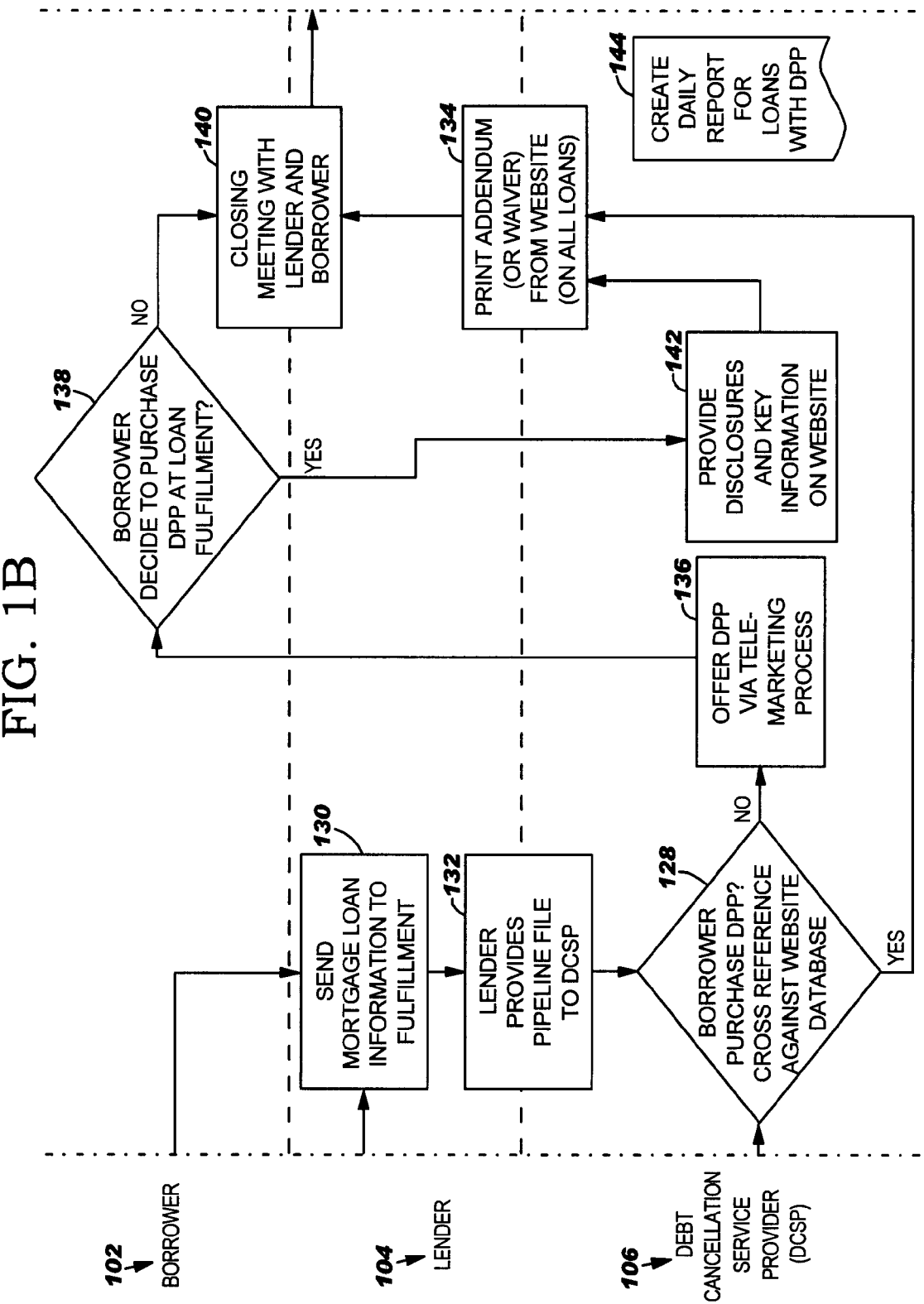
Figure 1C:
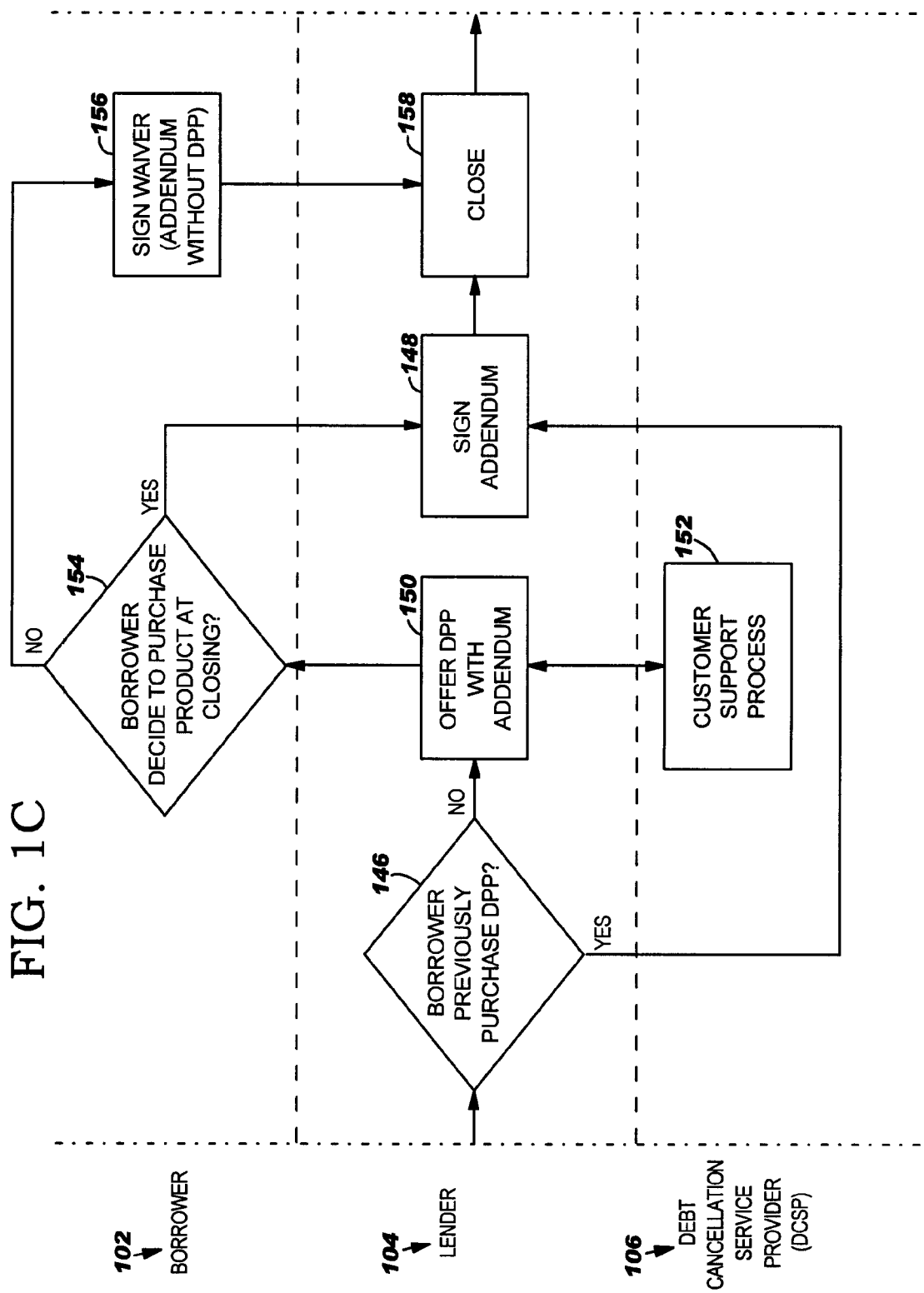
Figure 1D:
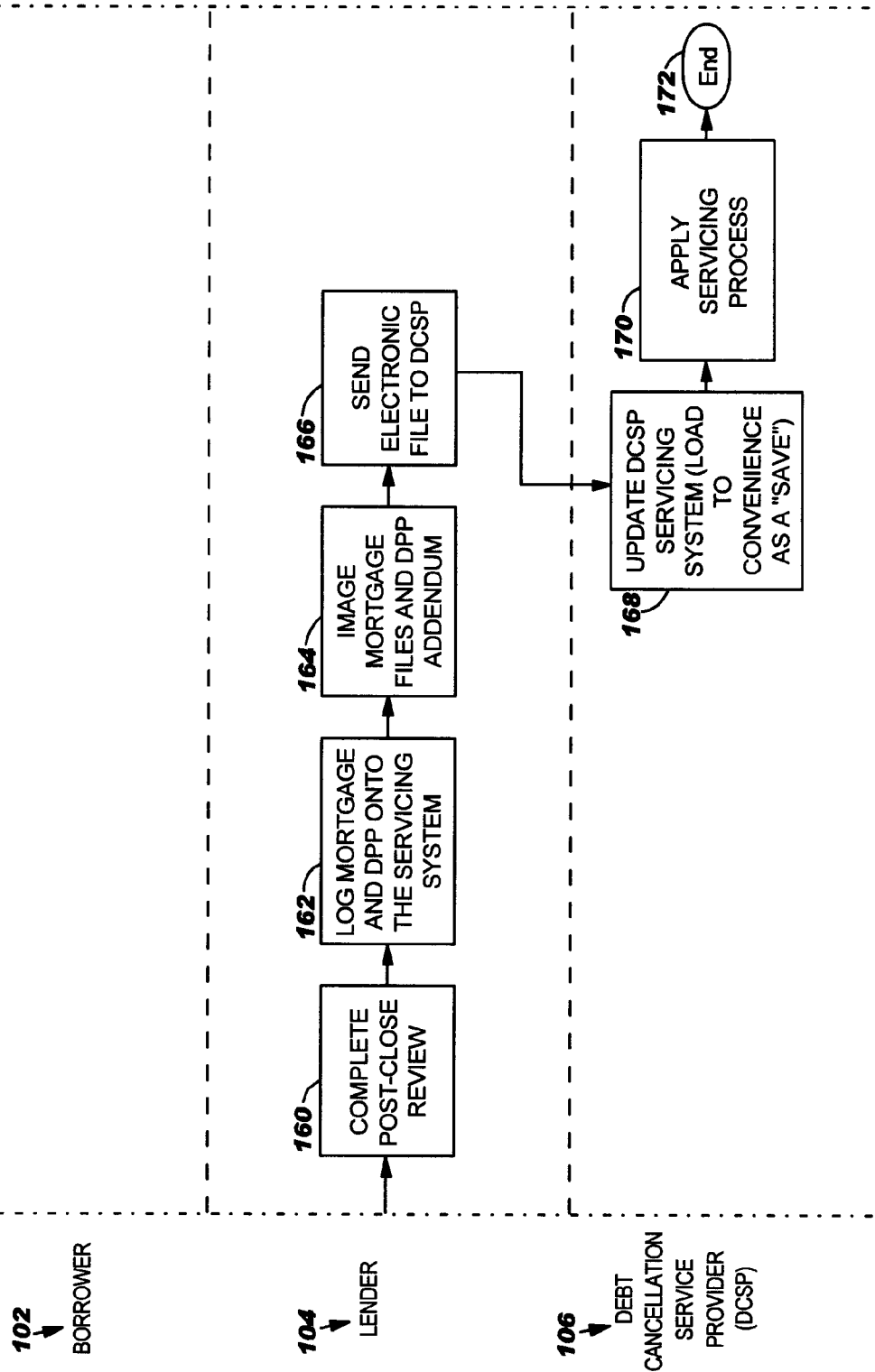

FIG. 1 is a flow chart of an example of a method 100 for debt protection or cancellation in accordance with an embodiment of the present invention. The flow chart is divided into sections illustrating actions or events that may involve a borrower 102, a lender 104 and a debt cancellation service provider 106 or similar entity or group of entities that may provide and service a debt protection or cancellation product as described herein. In block 108, a borrower may meet with a mortgage or loan representative of a lender or lending institution, such as a bank, credit union or other financial institution. In block 110, the mortgage representative may select and appropriate loan product based upon the borrowers circumstances and the purpose for the loan. In block 112, the lender or mortgage representative may advise the borrower about the debt protection or cancellation product and may access a web site of a debt cancellation service provider for information about the product and for a quote for the product based on information related to the borrower and the loan. The lender may input or enter selected information related to the borrower and the loan product into a web form or the like presented on a web page. The web form may be created using Java, HTML or other web-based language. The selected information related to the borrower may include basic demographic information, such as age, sex, resident address, credit history and the like. The selected loan information may include amount being borrowed, security or collateral, term of the loan, interest rate and similar information. In block 114, the lender may provide the borrower information about the debt protection or cancellation product (DPP). The information may include a short form disclosure related to the loan and DPP as required by Federal Law. In block 116, a determination may be made whether the borrower has any questions about the DPP. If the borrower does have questions, the lender may access a customer support process in block 118 or may refer the borrower to the customer support process. The customer support process may involve obtaining information or posing questions via e-mail, instant messaging, instant relay chat or the like. The customer support process may also include obtaining information or posing questions via a voice response unit (VRU), live consultant or the like or any combination of the above.

If the borrower does not have any questions about the DPP in block 116, the method 100 may advance to block 120. In block 120, a determination may be made if the borrower has an interest or wants to purchase the DPP at loan origination. If the borrower does not have an interest in purchasing the DPP, the method 100 may advance to block 130 in FIG. 1B. If the borrower does have an interest in purchasing the DPP product in block 120, the method 100 may advance to block 122. In block 122, the borrower may be prequalified for the loan and DPP and the lender may present to the borrower the monthly payment amount including the DPP. The information will be presented via long form disclosures as required by law. After disclosures in block 122, a determination may be made in block 124 whether the borrower wants to purchase the (DPP). If the borrower does want to purchase the DPP in block 124, the method 100 may advance to block 126. In block 126, the lender may save, upload or transfer selected borrower and loan information to the web site of the debt cancellation service provider (DCSP). The method 100 may then advance to block 128 in FIG. 1B.

Returning to block 124 in FIG. 1A, if the borrower does not want to purchase the DPP in block 124, the method 100 may advance to block 130. In block 130, the mortgage loan information may be sent to fulfillment for further loan processing. In block 132, the lender may provide a pipeline file including selected borrower and loan information to the debt cancellation service provider (DCSP). In block 128 a determination may be made whether the borrower purchased the DPP. A cross-reference may be made against the web site database as a check to confirm whether or not the borrower elected to purchase the DPP. If the borrower did elect to purchase the DPP in block 128, the method 100 may advance to block 134. If the borrower did not elect to purchase to DPP, the method 100 may advance to block 136. In block 136, the DPP may be offered again to the borrower via a telemarketing process or other means. In block 138, another determination may be made as to whether the borrower decided to purchase to DPP at loan fulfillment. If not, the method 100 may advance to block 140 and the closing meeting may be conducted with the lender and borrower. If the borrower did decide to purchase the DPP at loan fulfillment, disclosures and key information may be provided on the web site of the debt cancellation service provider in block 142. In block 134, an addendum may be printed by the lender from the web site of the debt cancellation service provider to be included in the loan closing documentation for the borrower to execute to include the DPP as a part of, or an addendum to, the loan or mortgage. Alternatively, a waiver may be printed by the lender from the web site if the borrower is not going to purchase the DPP. A daily report may be created for loans with the DPP by the debt cancellation service provider in block 144.

In the closing meeting, another determination may be made in block 146 (FIG. 1C) as to whether the borrower previously purchased or expressed interest in purchasing the DPP. If the borrower has previously indicated a desire to purchase the DPP in block 146, then the borrower may sign the addendum in block 148. If the borrower has not previously indicated a desire to purchase the DPP in block 146, the DPP may be offered again with the addendum in block 150. The debt cancellation service provider's customer support process may be consulted in block 152 for any assistance, such as responding to any questions that the borrower may have or a real-time basis.

In block 154, a determination may be made whether the borrower decided to purchase the DPP at closing. If the borrower did decide to purchase the DPP in block 154, the borrower may sign the addendum in block 148. If the borrower decided not to buy the DPP, the borrower may sign a waiver or addendum to the loan documentation without the DPP in block 156. The loan or mortgage may then be closed in block 158.

In block 160 (FIG. 1D), a post-closing review may be completed to pickup any inaccuracies in any of the closing documentation or errors or omissions in the loan processing and closing process. In block 162, the loan or mortgage and DPP information may be loaded or logged into a servicing system. The servicing system may be maintained by the debt cancellation service provider (DCSP) or by another entity under contract with the DCSP. In block 164, the mortgage files and DPP addendum may be scanned or imaged. In block 166, the scanned or electronic files may be sent to the debt cancellation service provider. In block 168, the debt cancellation service provider may update the servicing system with reference to the electronic files and in block 170 any servicing processing may be applied. Servicing may include collecting fess and mortgage payment, paying benefits or claims in the event one of the triggers associated with the DPP is activated. Examples of possible triggers may include disability of the borrower, involuntary loss of employment, accidental death or the like. Services may also include accounting, auditing and other administrative and customer services. The method 100 may end or terminate at block 172.

Figure 2:
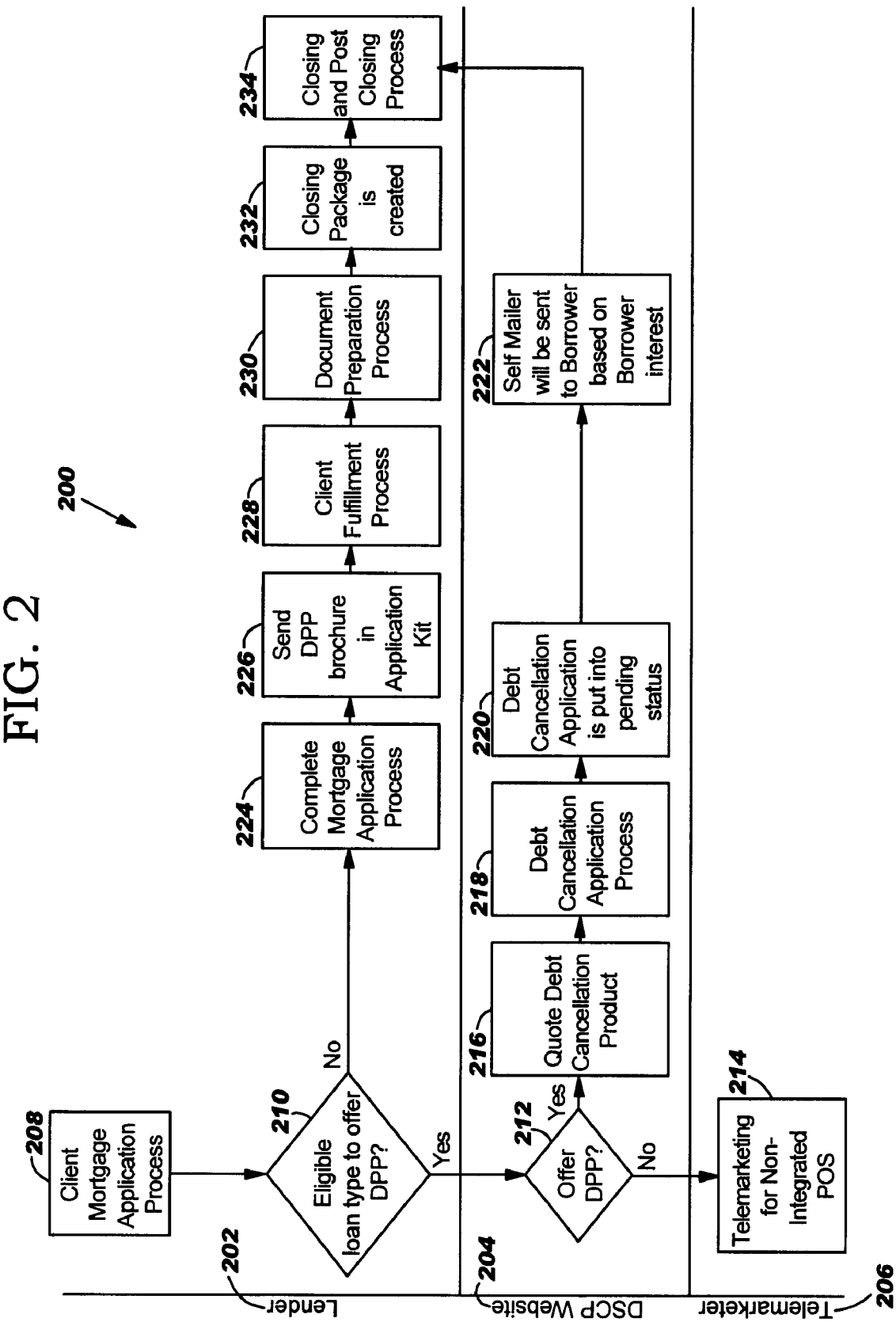
FIG. 2 is a flow chart of an example of a method for a non-integrated point of sale processing of a debt protection or cancellation product in accordance with an embodiment of the present invention.

FIG. 2 is a flow chart of an example of a method 200 for a non-integrated point of sale processing of a debt protection or cancellation product in accordance with an embodiment of the present invention. The flow chart in FIG. 2 is also divided into sections illustrating actions or events that may involve a lender 202, a website 204 of a debt cancellation service provider (DCSP Website) and a telemarketer 206. In block 208, a client or borrower mortgage or loan application process may take place. This process may involve the actual completion of the application by the borrower and other preliminary actions to start the loan acquisition and approval process. In block 210, a determination may be made whether the loan is a type eligible to offer a debt protection product (DPP). Whether the loan is a type eligible to offer the DPP may be determined by criteria set by the lender or the debt cancellation service provider or both. Some consumer loans, such as loans for vehicles, watercraft, aircraft or the like may not be eligible for DPP or the borrower may not fit the criteria for the DPP. In block 212, a determination may be made whether the DPP was offered. If the DPP was not offered in block 212, the method 200 may advance to block 214 and a telemarketing process may be implemented for a non-integrated point of sale. If the DPP was offered in block 212, a quote for the DPP may be provided in block 216 via the DCSP website similar to that described with respect to block 122 of FIG. 1A. An example of a website quote process will be described in detail with respect to method 300 of FIG. 3. In block 218, the application process for the DPP may be performed. An example of a website application process will be described with respect to method 400 of FIG. 4. In block 220 the debt cancellation application may be placed in a pending status. In block 222, a self mailer or business reply correspondence may be sent to the borrower or customer depending upon the interest expressed by the borrower in the DPP.

Returning to block 210, if the loan is not a type eligible to offer the DPP, the method 200 may advance to block 224. In block 224, the mortgage or loan application process may be completed. In block 226, a DPP brochure or other information may be sent to a borrower in an application kit or the like. In block 228, the client or borrower fulfillment process or further processing of the loan application may be processed. An example of the fulfillment process will be described with respect to method 500 in FIG. 5. In block 230, all the documents needed for the closing may be processed and in block 232 a closing package may be created including all of the closing documents. In block 234, the closing may be conducted and the post closing activity or process performed.

Figure 3:
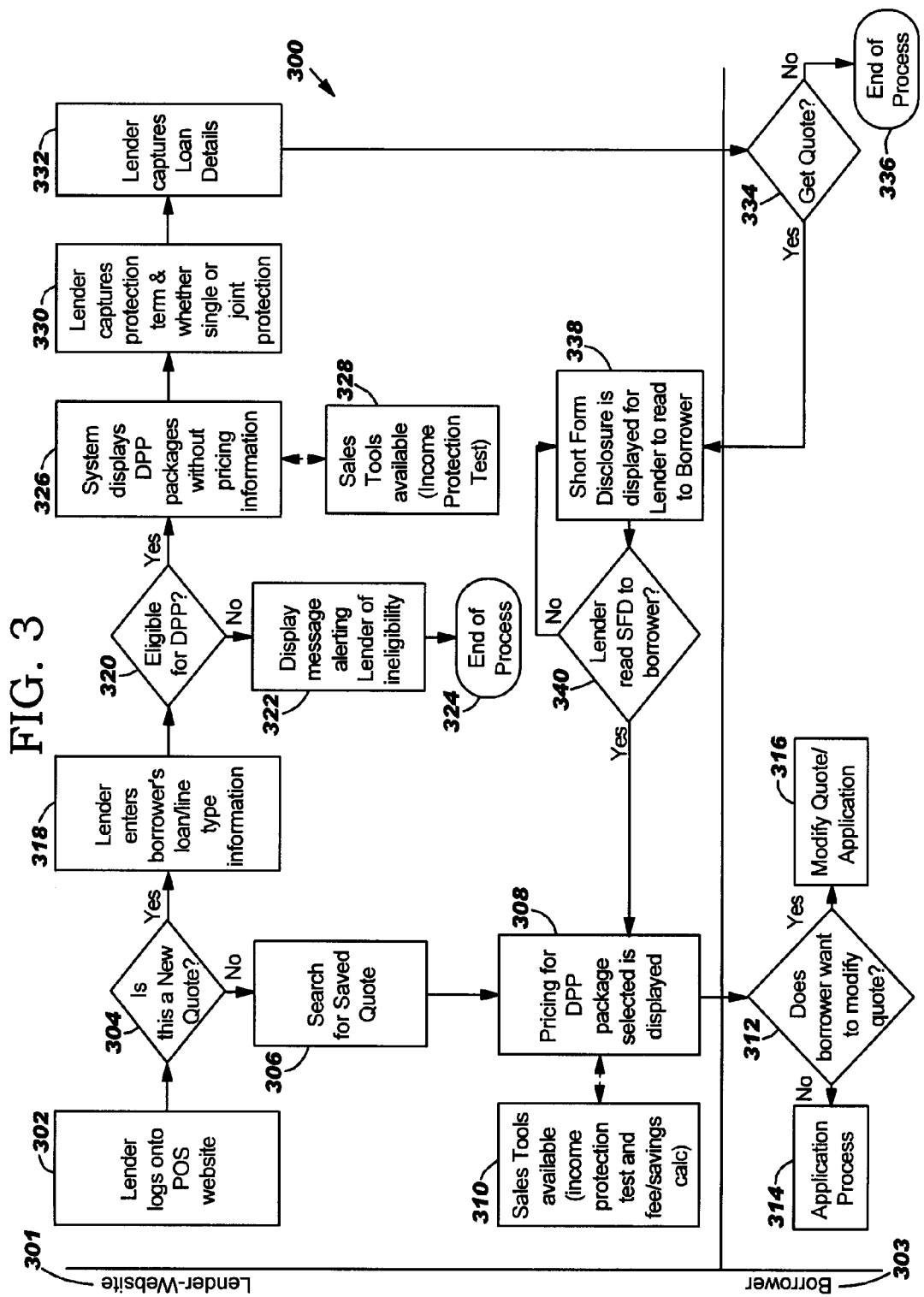
FIG. 3 is a flow chart of an example of a method for providing a quote for a debt protection or cancellation product in accordance with an embodiment of the present invention.

FIG. 3 is a flow chart of an example of a method 300 for providing a quote for a debt protection or cancellation product in accordance with an embodiment of the present invention. The flow chart is divided into sections to illustrate the activities that may be associated with each entity, such as the lender 301 or website and the borrower 303. In block 302, a lender may log onto a point of sale (POS) website. The website may be hosted by a debt cancellation service provider (DCSP). A determination may be made in block 304 whether or not the quote request is for a new quote. If the request is not for a new quote in block 304, a search for a saved quote may be conducted in block 306. In block 308, a price for the selected DPP package may be displayed. Different sales tools may be accessed in block 310 to allow a borrower to evaluate the benefits of the DPP in making a purchase decision. The tools may include an income protection test to evaluate a borrower's protection in the event of a trigger event that would permit a claim to be made and a benefit paid on the DPP. The tool may also include a fee/savings calculator to further evaluate the DPP and the benefits provided by the product.

In block 312, a determination may be made whether the borrower wants to modify the quote by selecting different features or benefits associated with the DPP, such an inflation feature, degree of disability, single or joint protection, life events such as marriage, divorce, birth of a child, graduation from college or the like. If the borrower does not want to modify the quote by adjusting one or more features of the DPP, the method 300 may advance to block 314 and the application process may be performed similar to that described with respect to method 400 of FIG. 4 below. If the borrower does desire to modify the quote in block 312, the method 300 may advance to block 316 and different features may be selected or entered in the web page for developing the quote.

Returning to block 304, if a determination is made that the quote is a new quote, the method 300 may advance to block 318. In block 318, the lender may enter selected information about the borrower and loan information into a web page or web form. In block 320, a determination may be made with respect to eligibility for the DPP based on the borrower and loan information entered in block 318. If the borrower or loan information indicates ineligibility for the DPP in block 320, a message may be presented or displayed to the lender in block 322 of the ineligibility. The process may then end at termination 324.

Returning to block 320, if the borrower and loan are eligible for the DPP, the method 300 may advance to block 326. In block 326, the system may display DPP packages. The DPP packages may be presented or displayed without pricing information. The sales tools, similar to that previously described with respect to block 310 may be accessed in block 328. In block 330, the lender may capture protection terms, such as disability packaged with involuntary unemployment or any combination of protected event features, and whether single or joint protection for both spouses is desired. In block 332, the lender captures the loan details.

In block 334, the borrower may make a decision whether or not to get the quote. If the borrower elects not to get the quote in block 334, the method 300 may end at termination 336. If the borrower elects to get the quote in block 334, a short form disclosure regarding the loan and DPP may be displayed for the borrower to read or for the lender to read or print for the borrower in block 338. A determination may be made in block 340 whether the lender read the short form disclosure (SFD) to the borrower or printed the SFD for the borrower to read. If the response to block 340 is no, the method 300 may return to block 338. If the response to block 340 is yes, the method 300 may advance to block 308 and the method 300 may proceed as previously described with respect to blocks 308-316.

Figure 4:
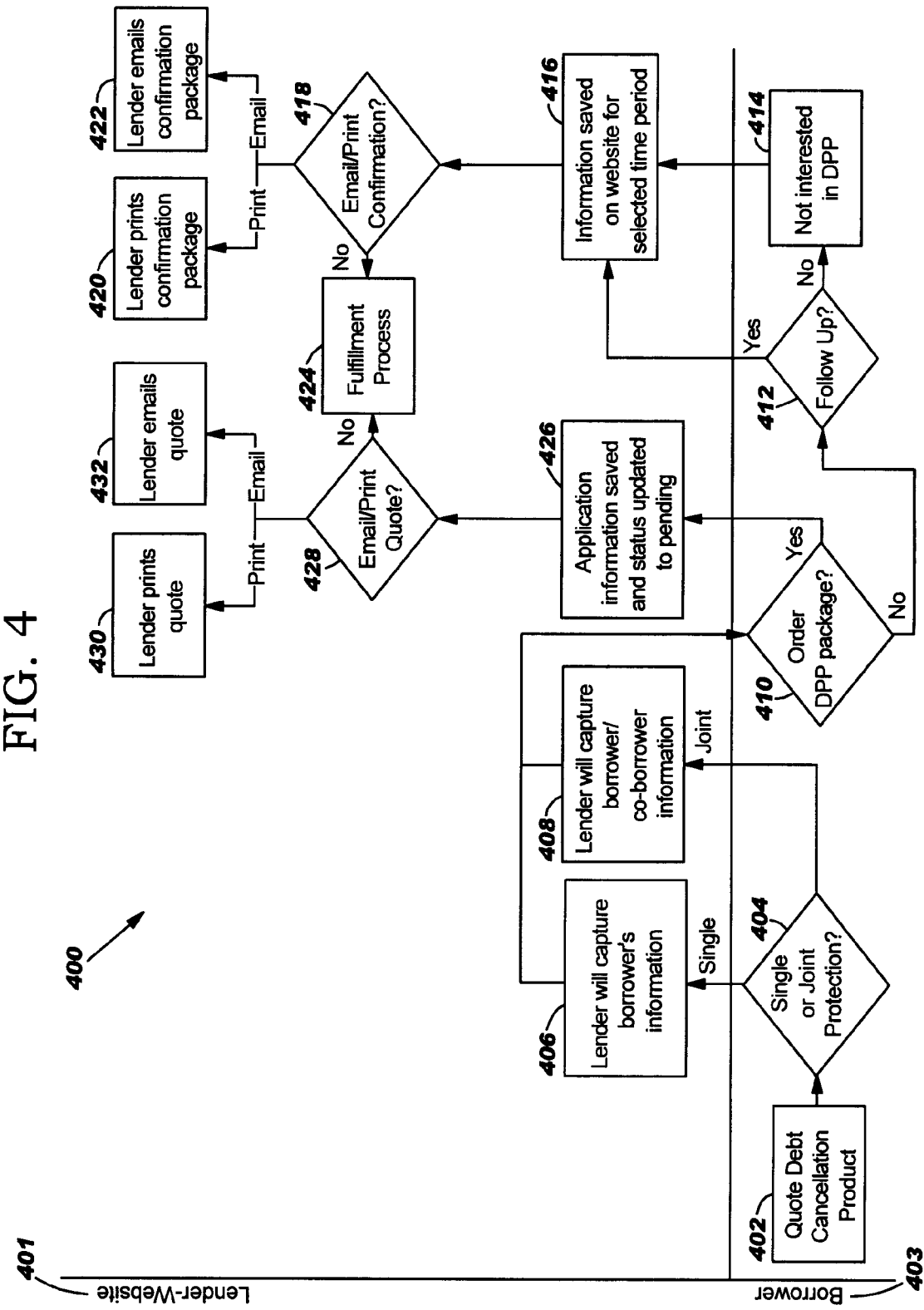
FIG. 4 is a flow chart of an example of a method for applying for a debt protection or cancellation product in accordance with an embodiment of the present invention.

FIG. 4 is a flow chart of an example of a method 400 for making an application for a debt protection or cancellation product in accordance with an embodiment of the present invention. The flow chart may be divided into sections to illustrate the activities that may be associated with each entity, such as the lender 401 or website or borrower 403. In block 402, the debt cancellation product or DPP is quoted. In block 404, a determination may be made whether the DPP is for single or joint protection. If the DPP is for single protection in block 404, the lender may capture the single borrower's information in block 406. If the DPP is for joint protection, the lender may capture the information for both borrower and co-borrower in block 408. In block 410, a determination may be made whether to order the DPP package. If the borrower makes a decision not to order the DPP package in block 410, the borrower may select whether he wants any follow-up in block 412. If the borrower selected no follow-up in block 412, the method 400 advances to block 414 indicating that the borrower has no interest in the DPP. The information regarding the borrower's decision regarding the DPP may be saved on the web site for a selected period of time in block 416. For example, the information may be saved for ninety days.

If the borrower selects or requests follow-up in block 412 regarding the DPP, the borrower's information may be saved in block 416 for the selected time period as previously described. In block 418, a determination may be made whether to print or email a confirmation of the borrower's decision and status. The lender may print the confirmation package in block 420 or email the confirmation package in block 422 to the borrower. If a decision is made to neither print nor email a confirmation package, the fulfillment process may proceed in block 424. An example of the fulfillment process is described with respect to method 500 in FIG. 5.

Returning to decision block 410, if the borrower decides to order the DPP package, the method 400 may advance to block 426. In block 426, the application information may be saved and the status of the loan and DPP updated to pending. In block 428 a determination may be made whether or not to email or print the quote for the DPP. If a decision is made not to email or print the quote, the method 400 may advance to block 424 and the fulfillment process may be performed as previously described. If a decision is made to email or print the quote, the lender may print the quote in block 430 and email the quote in block 432.

Figure 5:
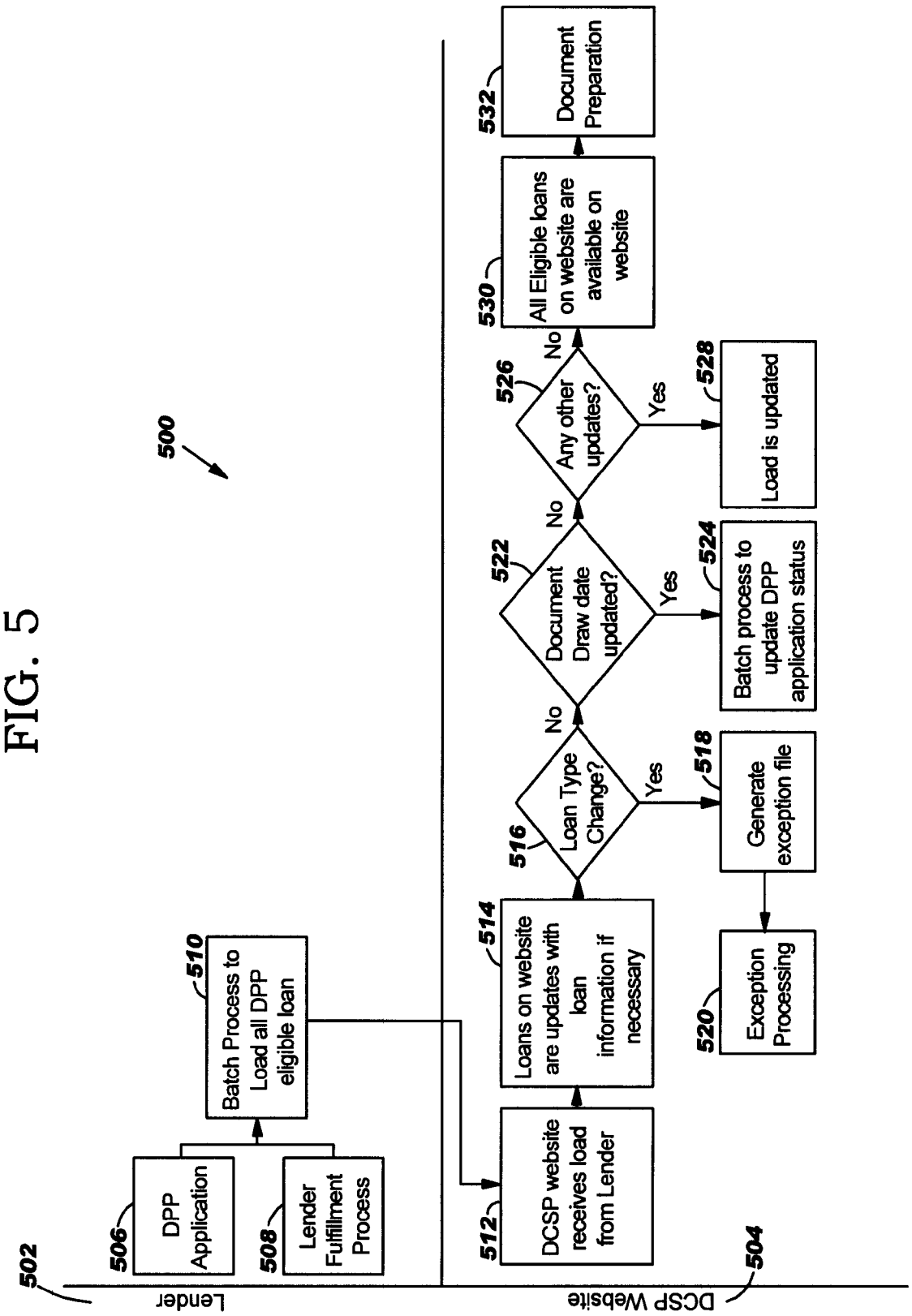
FIG. 5 is a flow chart of an example of a method for fulfillment of a loan including a debt protection or cancellation product in accordance with an embodiment of the present invention.

FIG. 5 is a flow chart of an example of a method 500 for fulfillment of a loan including a debt protection or cancellation product (DPP) in accordance with an embodiment of the present invention. The flow chart may be divided to illustrate which activities may be performed by the lender 502 and which activities may be performed by the debt cancellation service provider (DCSP) or on the DCSP website 504. The DPP application process in block 506 and client or lender fulfillment process 508 may be batch processed in block 510 to upload the eligible loan and associated DPP information to the DCSP website in block 512. In block 514, loans on the website may be updated with loan information if necessary. In block 516, a determination may be made whether a loan type has changes. Examples of loan types may include 30 year versus 15 year fixed, interest only loans, adjustable rate mortgages or the like. If the loan type has changed in block 516 an exception file may be generated in block 518. The exception file provides for a systematic match between the lender and DCSP to ensure that the new loan type, if changed remains eligible for adding a DPP. An exception process may be performed in block 520. The exception process may include verification of a change in loan type and possible contact with customer to inform customer if loan type is no longer eligible for DPP.

If the loan type did not change in block 516, the method 500 may advance to block 522. In block 522, a determination may be made whether a document draw date has been updated. The document draw date is the date in which final loan documentation is produced including the DPP addendum. If the document draw date has been update in block 522, a batch process may be performed in block 524 to update DPP application status. If the document draw date has not been updated in block 522, the method 500 may advance to block 526. In block 526, a determination may be made whether any other updates are needed. If updates are needed in block 526, the loan may be updated in block 528. If no updates are needed in block 526, the method 500 may advance to block 530. In block 530, all eligible loans on the website are available on the website. In block 532, document preparation may be performed. Document preparation may include preparing all of the documents required for closing, such as the mortgage note, HUD statement, legal disclosures, title documents and similar documents.

Figure 6:
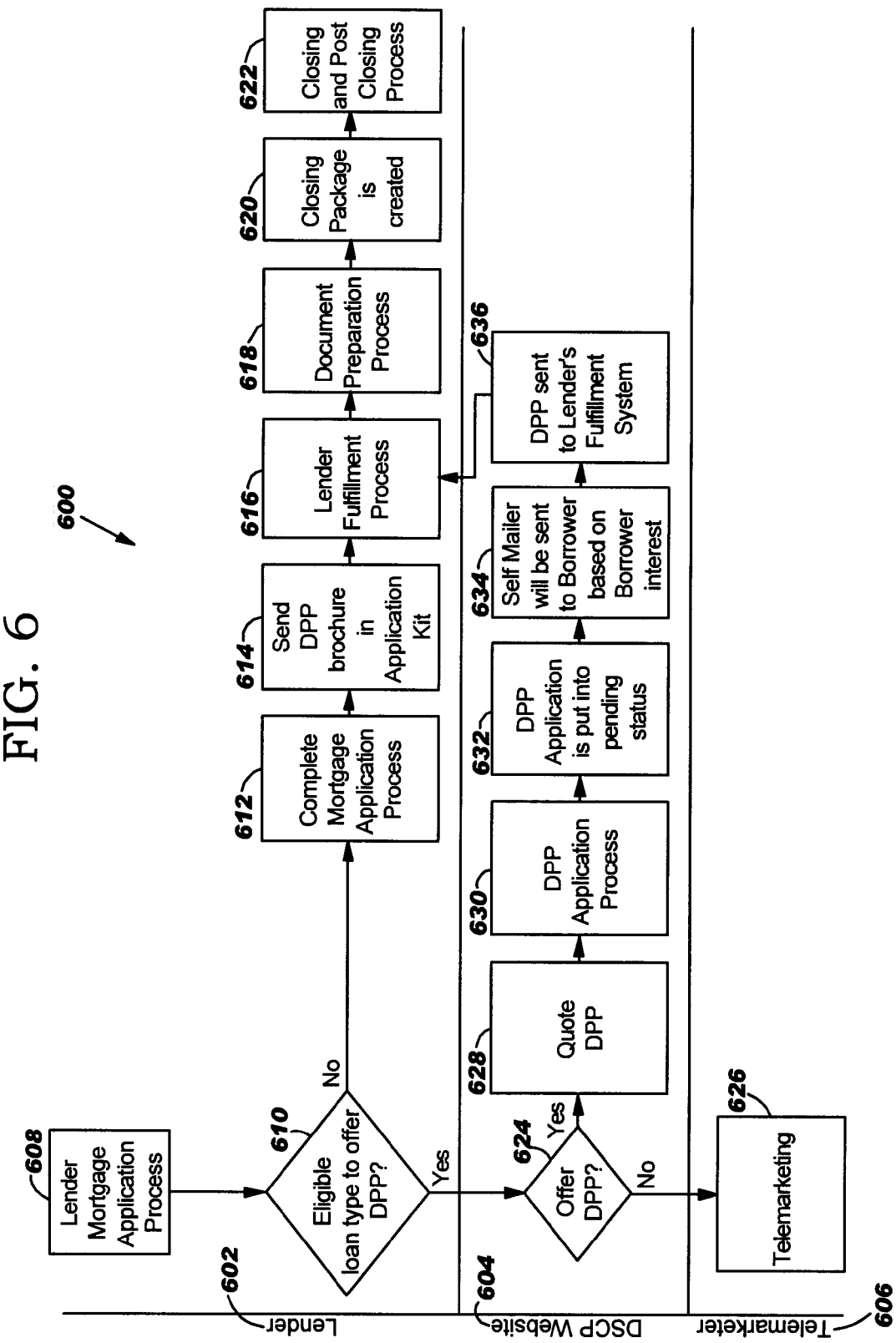
FIG. 6 is a flow chart of an example of a method for a semi-integrated point of sale processing of a debt protection or cancellation product in accordance with an embodiment of the present invention.

FIG. 6 is a flow chart of an example of a method 600 for a semi-integrated point of sale processing of a debt protection or cancellation product in accordance with an embodiment of the present invention. The flow chart is divided into sections illustrating the actions that may be associated with each entity, such as the lender 602, debt cancellation service provider (DCSP) website 604 and telemarketer 606 or the like. In block 608, the lender or client mortgage or loan application process may be preformed. In block 610, a determination may be made whether the loan is a type eligible to offer the DPP. If the loan in not a type eligible for the DPP, the method 600 may advance to block 612. In block 612, the mortgage or loan application process may be completed. In block 614, a DPP brochure or information may be sent to the borrower in an application kit. In block 616, the lender fulfillment process may be performed. In block 618, the document preparation process may be performed to prepare the closing documents, similar to that previously described. The closing package including the closing documents may be created in block 620 and the closing and post closing process may be performed in block 622. Examples of methods for the closing and post closing processes or activities will be described in detail with respect to FIGS. 8 and 9 below.

Returning to block 610, if a determination is made that the loan is a type eligible to offer the DPP, the method 600 may advance to block 624. In block 624, a determination may be made whether the DPP has been offered. If the DPP has not been offered, the method 600 may advance to block 626 and telemarketing process may be implemented to contact the borrower with respect to purchasing the DPP. If the DPP was offered in block 624, the method 600 may advance to block 628 and a quote for the DPP may be determined based on selected borrower and loan information and presented to the borrower. The quote process in block 628 may be similar to that previously described with respect to method 300 of FIG. 3. In block 630, the DPP application process may be performed. The application process may be similar to that previously described with respect to method 400 of FIG. 4. In block 632, the DPP application may be put into a pending status while the loan is processed and closing documents prepared. In block 634, a self mailer may be sent to the borrower based on the borrower's interest in the DPP. The self mailer may be a direct mail piece with a self addressed, stamped envelope for the customer to reply and enroll in the DPP. In block 636, the DPP file may be sent to the lender's fulfillment system in block 616. The method 600 may then proceed as previously described with respect to blocks 616-622.

Figure 7:
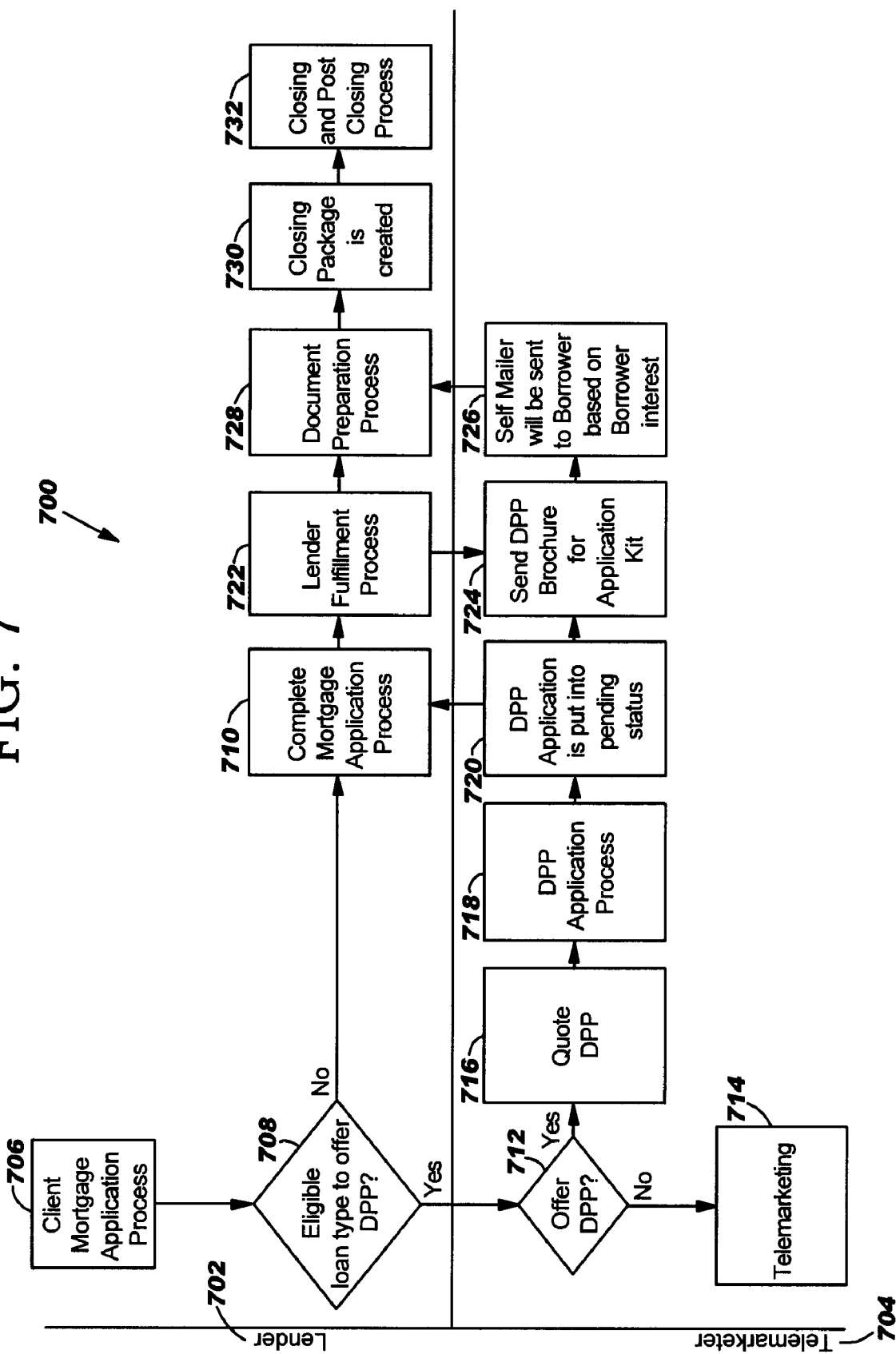
FIG. 7 is a flow chart of an example of a method for an integrated point of sale processing of a debt protection or cancellation product in accordance with an embodiment of the present invention.

FIG. 7 is a flow chart of an example of a method 700 for an integrated point of sale offering of a debt protection or cancellation product (DPP) in accordance with an embodiment of the present invention. Similar to other flow charts, this flow chart is also divided into sections illustrating the actions that may be associated with each entity, such as the lender 702 and telemarketer 704 or the like. In block 706, the lender's or client's mortgage or loan application process may be preformed. In block 708, a determination may be made whether the loan is a type that is eligible to offer the DPP. If the loan is not a type eligible for the DPP, the method 700 may advance to block 710 and the mortgage or loan application process may be completed. If the loan is a type eligible for the DPP, the method 700 may advance to block 712. In block 712, a determination may be made whether the DPP has been offered to the borrower. If the DPP has not been offered in block 712, the method 700 may advance to block 714 where the DPP may be offered or presented to the borrower via a telemarketing process or other marketing procedure. If the DPP has been offered to the borrower in block 712, the method 700 may advance to block 716. In block 716, a quote for the DPP may be obtained. The process or method for obtaining a quote for the DPP may be similar to that described with respect to method 300 of FIG. 3. In block 718, a DPP application process may be performed. The DPP application process may be similar to that described with respect to method 400 of FIG. 4.

In block 720, the DPP application may be put into a pending status and the method 700 may advance to block 710. In block 710, the mortgage application process may be completed similar to that previously described. In block 722, the lender's fulfillment process may be performed. The fulfillment process may be similar to that described with respect to method 500 of FIG. 5.

In block 724, a DPP brochure or the like may be sent to the borrower for an application kit and in block 726, a self mailer may be sent to the borrower based on the borrower's interest. In block 728, a document preparation process may be performed to prepare all of the documents required for closing the loan or mortgage. In block 730, a closing package may be created including all of the closing documents. In block 732, a closing and post closing process may be performed. Examples of closing and post closing processes or activities will be described with respect to FIGS. 8 and 9.

Figure 8:
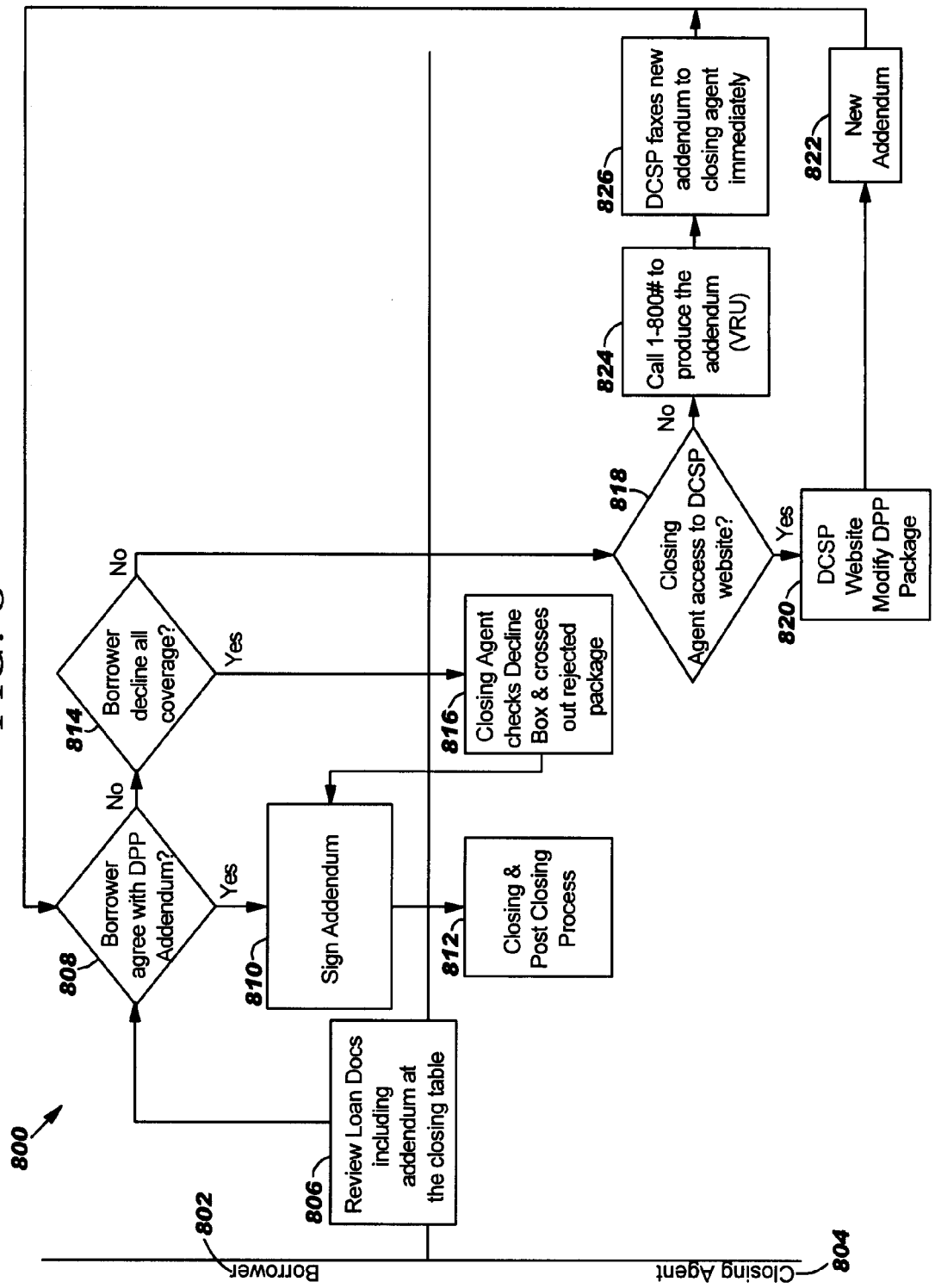
FIG. 8 is a flow chart of an example of a method for closing and post closing activities associated with a loan that may include a debt protection or cancellation product in accordance with one embodiment of the present invention.

FIG. 8 is a flow chart of an example of a method 800 for closing and post closing activities associated with a loan that may include a debt protection or cancellation product in accordance with one embodiment of the present invention. Similar to other flow charts herein, this chart is divided to indicate the actions or activities that may be performed by each entity or component, such as a borrower 802 and a closing agent 804. The closing agent 804 may be a personal banker, lawyer, real estate agent, title agent or the like. The method 800 may be used for the closing and closing process in block 234 in FIG. 2, block 622 in FIG. 6 or block 732 in FIG. 7. In block 806, the loan documents including the addendum for the DPP may be reviewed. In block 808, a determination may be made whether the borrower agrees with the DPP addendum and desires to purchase the DPP. If the borrower agrees with the DPP addendum, the borrower may sign the addendum in block 810 and the closing and post closing process may continue in block 812. Further closing and post closing activities will be described in more detail with respect to FIG. 9.

Returning to block 808, if the borrower does not accept the addendum for the DPP, a determination may be made in block 814 whether the borrower declines all coverage or may desire some limited form of debt protection. If the borrower declines all coverage in block 814, the method 800 may advance to block 816 and the closing agent may check a decline box and cross out the rejected package. This may be done online or on a hard copy of the closing documents. The borrower may then sign the addendum or waiver in block in 810 and the closing and post closing process may continue in block 812.

Returning to block 814, if the borrower does not decline all coverage but may desire some level of debt protection or cancellation, a determination may be made in block 818 whether the closing agent has access to the website of the debt cancellation service provider (DCSP). If the closing agent does have access to the DCSP website, the DPP may be modified online in block 820. A new addendum may be created and printed in block 822. The method 800 may then return to block 808 where a determination may be made whether the borrower agrees with the new addendum. If the borrower agrees with the new addendum in block 808, the new addendum may be signed in block 810 and the closing and post closing process in block 812.

Returning to block 818, if the closing agent does not have access to the DCSP website in block 818, the agent may call a toll free number to produce a modified addendum in block 824. A customer service representation at the DCSP may assist with preparing a modified addendum or a voice response unit (VRU) may be used to produce the modified addendum. In block 826, the DCSP or other consultant or service entity working under contract for the DCSP may fax a new addendum to the closing agent during the closing meeting. The method 800 may then return to block 808 where a determination may be made whether the borrower agrees with the new addendum and the method 800 may proceed as previously described with respect to blocks 810-812 or blocks 814 et seq.

Figure 9:
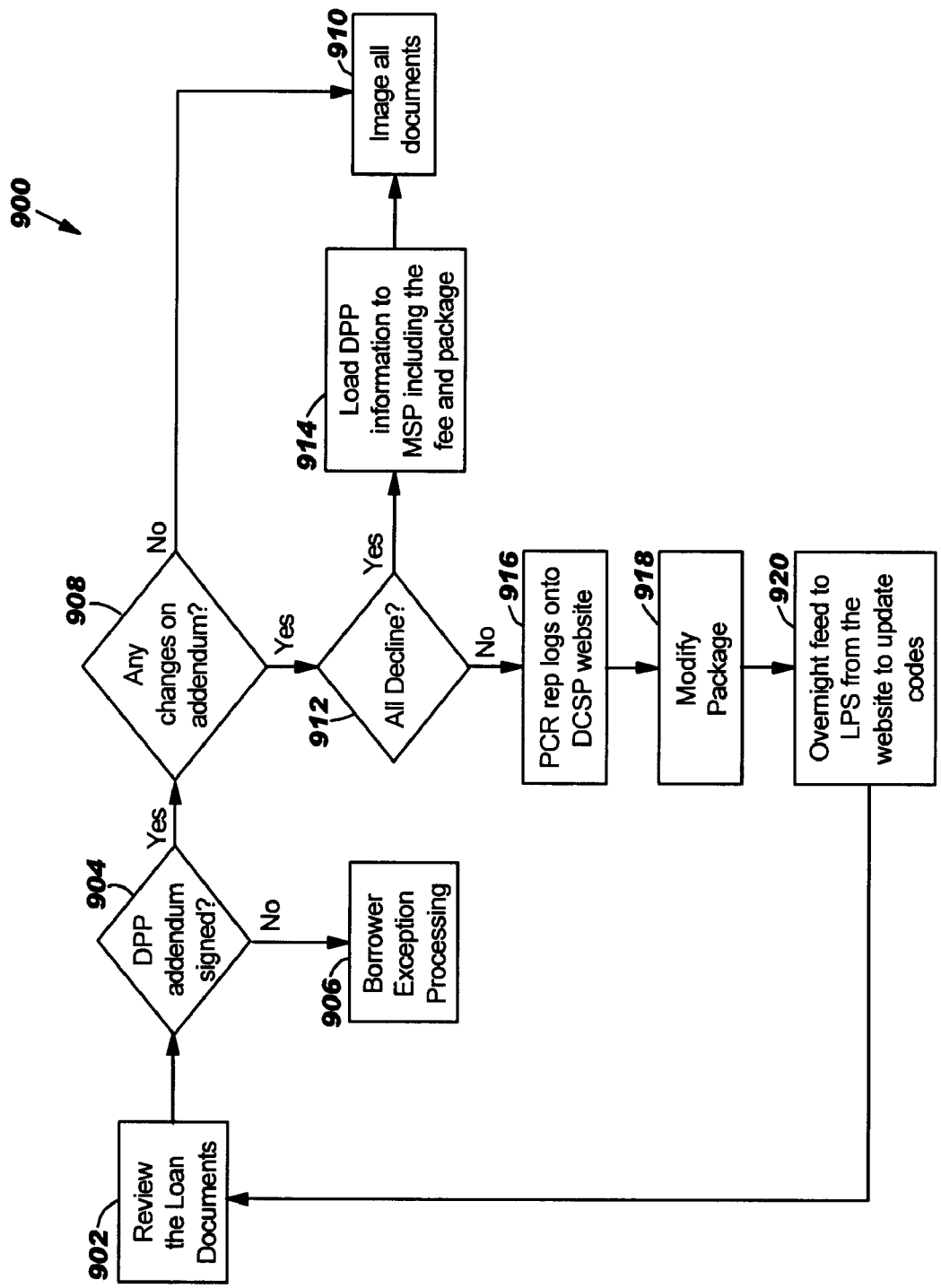
FIG. 9 is a flow chart of another example of a method for closing and post closing activities associated with a loan that may include a debt protection or cancellation product in accordance with another embodiment of the present invention.

FIG. 9 is a flow chart of another example of a method 900 for closing and post closing activities associated with a loan that may include a debt protection or cancellation product in accordance with another embodiment of the present invention. At least some portions of the method 900 may be used in the block 812 of method 800 of FIG. 8. In block 902, a post closing review (PCR) representative or the like may review the loan documents or loan closing documents. In block 904, a determination may be made whether the DPP addendum was signed. If the DPP addendum was not signed in block 904, the method 900 may proceed to block 906. In block 906, a borrower or client exception process may be performed. The borrower or client exception process may involve three attempts to obtain the borrower's signature on the DPP addendum in order to secure evidence of agreement to the terms and conditions of the DPP product. If no signature is obtained, the DPP product is automatically cancelled. If the DPP addendum was signed in block 904, a determination may be made in block 908 whether any changes were made on the addendum. If no changes were made, the method 800 may advance to block 910 and images of all documents may be made or the documents may be scanned into electronic files in block 910.

If changes were made to the addendum in block 908, a determination may be made in block 912 whether all changes were declined. If all changes were found to be declined in block 912, the method 900 may advance to block 914. In block 914, the DPP information may be loaded into a mortgage service provider (MSP) system or database including a fee and package. The documents may then be imaged or scanned in block 910, as previously described. If all changes were found not be declined in block 912, the method 900 may advance to block 916. In block 916, the post closing review (PCR) representative may log onto the website of the DCSP. In block 918, the PCR representative may modify the DPP package. In block 920, the modified package may be sent to the Loan Processing System (LPS). LPS is a generic term for a software system that may be used by a bank or lending institution to initially process new mortgage and installment loans. The system serves to set up the loan on the banks mortgage servicing systems for ongoing processing. The modified package may be sent overnight to update the codes in the loan documents. The method 900 may then return to block 902 where the method 900 may continue as previously described.

Figure 10:
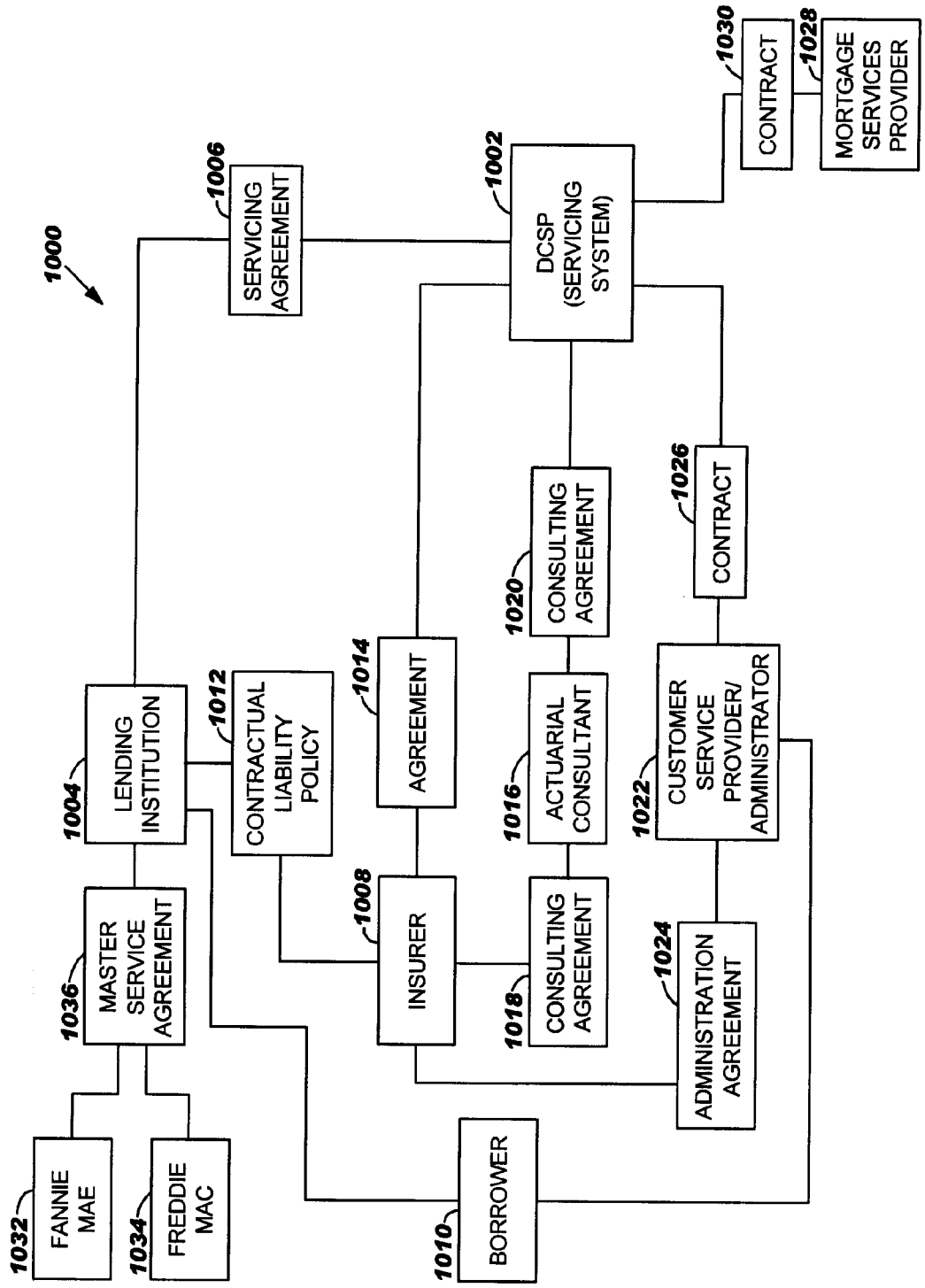
FIG. 10 is a block schematic diagram of an example system for debt protection or cancellation in accordance with an embodiment of the present invention.

FIG. 10 is a block schematic diagram of an example system 1000 for debt protection or cancellation in accordance with an embodiment of the present invention. The system 1000 may include a debt cancellation service provider (DCSP) 1002 or the like. The DCSP 1002 may service the debt protection or cancellation products (DPPs). The DCSP may provide marketing materials and maintain a website to inform potential borrowers or customers about the DPP and to facilitate providing quotes for the DPP and completion of an application process for the DPP online. The DCSP may also manage the issued DPPs including investigating claims and paying benefits as well as other customer service functions. The DCSP may provide these services to a lending institution 1004. The DPP process may be fully integrated, semi-integrated or not integrated at all with the lenders or lending institutions mortgage or loan process. If fully integrated, the lending institutions representative may access the website of DCSP to obtain quotes, perform the application process and the documents needed for closing will be provided for integration into the lender's closing documentation. If semi-integrated, portions of the DPP process are integrated into the mortgage or loan process of the lending institution and if non-integrated both processes may be carried out separately. The lending institution 1004 may enter into a serving agreement 1006 with the DCSP 1002 to provide whatever level of service or integration is desired.

An insurer 1008 may be included in the system 1000 to assume a risk of loss or liability based on claims by a borrower 1010 or benefits to be paid to the borrower 1010 under the level of protection or debt cancellation in the DPP. A contractual liability policy (CLP) 1012 may be in place between the lending institution 1004 and the insurer 1008. Under the CLP 1012 the insurer 1008 may be obligated to pay all or a portion of the borrower's debt according to the level of protection of the DPP to the lending institution 1004 in the event of a triggering event, such as disability, involuntary unemployment, a legal determination of insolvency, accidental death or other triggering event. Another agreement 1014 may be executed between the insurer 1008 and the DCSP 1002 to shift the risk or liability of losses or expenses from the DCSP 1002 to the insurer 1008 resulting from claims or benefits paid on the DPP.

A actuarial consultant 1016 may also be included to provide consulting services to both the DCSP 1002 and insurer 1008 in developing and providing quotes for the DPP. A consulting agreement 1018 and 1020 may be in place between the actuarial consultant 1016 and each of the insurer 1008 and the DCSP 1002, respectively.

A customer service provider/administrator 1022 may also be included to manage and maintain the website and to perform other customer service functions, such as help desk or help line, auditing, accounting as well as other services. An administration agreement 1024 to provide administrative services may be executed between the insurer 1008 and the customer service provider/administrator 1022. Similarly, a contract 1026 may be executed between the DCSP and the customer service provider/administrator for management and maintenance of the website, help desk and other administrative services or functions.

The DCSP 1002 may also rely of a mortgage service provider 1028 for record keeping, accounting and auditing expertise regarding any loads and associated DPPs. A contract 1030 may be in place between the DCSP 1002 and the mortgage services provider 1028 to define the rights and obligations between the parties and the level and type of services or functions to be performed.

The lending institution 1004 may also have a contractual connection or relationship with Fannie Mae 1032 and Freddie Mac 1034 via a master service agreement 1036. Fannie Mae 1032 is the Federal National Mortgage Association, a private corporation sponsored by the government that supplies funds for mortgages or publicly traded securities backed by it. Similarly, Freddie Mac is the Federal Home Loan Mortgage Corporation, also a private corporation sponsored by the government that supplies funds for mortgages or publicly traded securities backed by it.

Figure 11:
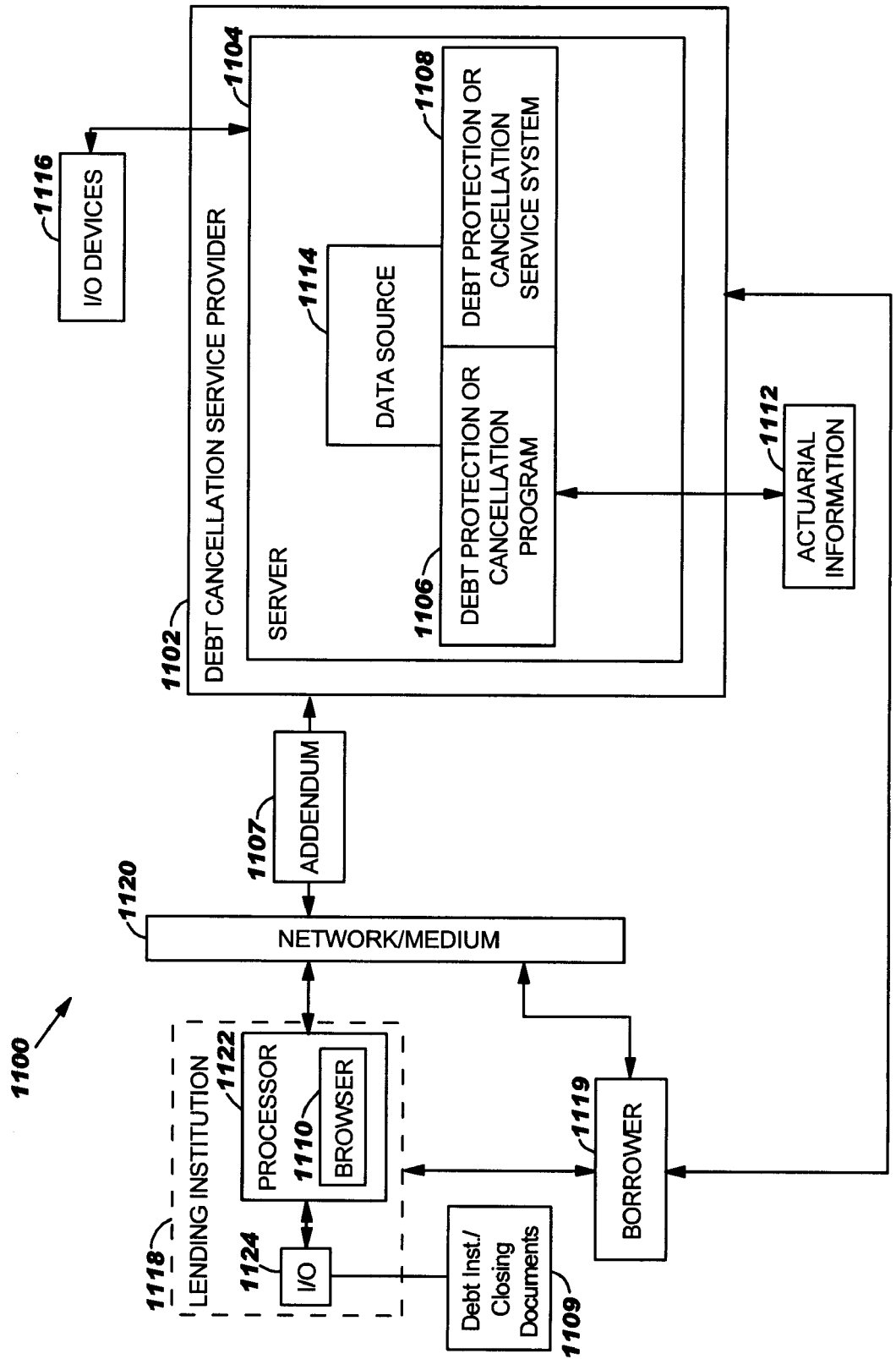
FIG. 11 is a block schematic diagram of an example of another system for debt protection or cancellation in accordance with another embodiment of the present invention.

FIG. 11 is a block schematic diagram of an example of another system 1100 for debt protection or cancellation in accordance with another embodiment of the present invention. The system 1100 may include a debt cancellation service provider 1102. The debt cancellation service provider 1102 may include a server 1104. The server 1104 may be a web server or the like. A debt protection or cancellation program or function 1106 may operate or run on the server 1104. A debt protection or cancellation service system 1108 may also operate or run on the server 1102. The debt protection or cancellation service system 1108 may be operable to service the debt protection or cancellation products (DPP) as described above. Elements or features of the methods 100-900 of FIGS. 1-9, respectively, may be embodied in the debt protection or cancellation program 1106 and service system 1108. The debt protection or cancellation program 1106 may be operable on the server 1104 to provide a debt protection or cancellation product (DPP) offerable with a loan as previously described herein. The debt protection and cancellation program 1106 may be adapted to create an addendum 1107 for the debt protection or cancellation product (DPP) for inclusion in a debt instrument or closing documents 1109 in response to an indication that a borrower wants to purchase the DPP, similar to that described above with respect to methods 100-900 of FIGS. 1-9. The debt protection or cancellation program 1106 may also be adapted or programmed to provide a quote for the DPP in response to selected information associated with a borrower and an associated loan. A lending institution representative may enter the selected borrower and loan information into a web page or web form when the debt protection or cancellation program 1106 is accessed via a web browser or the like, such as browser 1110. The debt protection or cancellation program may also be programmed or adapted to present a web page or form for completion of a application for a DPP.

The system 1100 may also include actuarial information 1112 to establish pricing or provide quotes for the DPP in response to selected borrower and loan or mortgage information. A data source 1114 may also be included to log debt protection or cancellation product information and associated loan information. The information may be logged in response to the DPP application process and in response to closing the loan with an addendum for the DPP. The logged information may also be used in servicing the DPP.

The system 1100 may also include input and output (I/O) devices. The I/O devices 1116 may be separate input and output devices or combination I/O devices that may be coupled to the server 1104 to provide an interface with the server 1104 for programming purposes and to control operation of the server 1104. Examples of the I/O devices 1106 may include a keyboard, pointing devices, display or monitor, disk drives, optical, mechanical, or infrared I/O devices or the like.

A lending institution 1118, borrower 1119 or other user may access the debt protection or cancellation program 1106 via a network 1120, medium or the like, using a browser 1110. The network or medium 1120 may be the Internet or a private network, such as an intranet or the like. The network or medium 1120 may also be any communication network or system including by way of example, dedicated communication lines, telephone networks, and wireless data transmission systems, two-way cable systems, and customized computer networks, interactive kiosk networks or the like.

The browser 1110 may operate on a processor 1122. Separate input and output devices 1124 or combination I/O devices may be coupled to the processor 1122 to permit a lending institution representative or other user to operate and interface with the processor 1122. The I/O devices 1124 may be similar to the I/O devices 1116. Examples of the I/O devices 1124 may include a keyboard, pointing device, display or monitor, disk drives, optical, mechanical, magnetic, or infrared input/output devices or the like. The I/O devices 1124 may be used to provide the addendum 1107 for the DPP and the debt instrument of closing documents 1109 including the addendum 1107 for the DPP.

Elements of the present invention, such as method 100-900 of FIGS. 1-9, respectively, system 800 of FIG. 8 and system 900 of FIG. 9 may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 800 of FIGS. 8 or system 900 of FIG. 9. Examples of such a medium may be illustrated in FIG. 9 as medium 1120 or I/O devices 1116 and 1124. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptions or variations of the present invention. The following claims are in no way intended to limit the scope of the invention to the specific embodiments described herein.

The invention claimed is:

1. A method for debt protection or cancellation, comprising:
offering a borrower a debt protection or cancellation product as a part of a mortgage in response to the mortgage being offered to the borrower, the debt protection or cancellation product allowing for cancelling at least a portion of the mortgage in response to a triggering event occurring, the debt protection or cancellation product being offered as an addendum to the mortgage so that the debt protection or cancellation product is part of the mortgage, wherein said offering is performed using a computer configured to perform said offering;
collecting a periodic fee in response to the borrower accepting the debt protection or cancellation product;
adding a waiver for the debt protection or cancellation product in closing documentation in response to the borrower rejecting the offer to purchase the debt protection or cancellation product; and
cancelling, via a computer at least a portion of the mortgage so that the at least a portion of the mortgage is no longer owed in response to a triggering event.

2. The method of claim 1, wherein offering the debt protection or cancellation product comprises at least one of offering the debt protection or cancellation product through a lending institution extending the mortgage, and offering the debt protection or cancellation product through a debt cancellation service provider.

3. The method of claim 1, wherein offering the debt protection or cancellation product comprises offering the product via one of a non-integrated point of sale, a semi-integrated point of sale and an integrated point of sale.

4. The method of claim 1, wherein offering the debt protection or cancellation product comprises offering the product via at least one of telemarketing and direct mailing.

5. The method of claim 1, wherein further comprising providing a quote for the debt protection or cancellation product responsive to selected information related to the borrower and the mortgage.

6. The method of claim 5, wherein providing the quote comprises accessing an interactive web site of a debt cancellation service to enter the selected information related to the borrower and the mortgage.

7. The method of claim 1, further comprising transferring selected information associated with the borrower and the mortgage to a debt protection or cancellation service provider.

8. The method of claim 1, further comprising adding an addendum for the debt protection or cancellation product to a debt instrument in response to the borrower wanting to purchase the debt protection or cancellation product.

9. The method of claim 8, further comprising presenting the addendum for printing from a web site of a debt cancellation service provider.

10. The method of claim 1, further comprising loading the debt protection or cancellation product information and associated loan information into a servicing system in response to closing the mortgage with a debt protection or cancellation addendum.

11. The method of claim 10, wherein the servicing system is maintained by a debt cancellation service provider.

12. The method of claim 1, further comprising completing an application for the debt protection or cancellation product by entering selected borrower and loan information at a web site of a debt protection or cancellation service provider.

13. A method for debt protection or cancellation, comprising:
providing an addendum for a debt protection or cancellation product for inclusion in a debt instrument related to a mortgage at an origination of the mortgage for a borrower so that the debt protection or cancellation product is a part of the debt instrument related to the mortgage, the addendum being provided in response to the borrower accepting the debt protection or cancellation product, the debt protection or cancellation product allowing for cancelling at least a portion of the mortgage so that the at least a portion of the mortgage is no longer owed in response to a triggering event occurring, the addendum being an integrated feature the mortgage such that if the mortgage is transferred to a buyer, the debt protection or cancellation product portion of the mortgage is also transferred to and owned by the buyer, wherein said providing is performed using a computer configured to perform said providing;
providing a waiver for the debt protection or cancellation product for inclusion in closing documentation in response to the borrower rejecting the debt protection or cancellation product; and
servicing, via a computer the debt protection or cancellation product in response to a borrower purchasing the debt protection or cancellation product, the servicing comprising cancelling at least a portion of the mortgage so that the at least a portion of the mortgage is no longer owed in response to a triggering event.

14. The method of claim 13, further comprising providing a quote for the debt protection or cancellation product in response to accessing a web site of a debt cancellation service provider and entering selected borrower and loan information.

15. The method of claim 13, further comprising transferring selected information associated with the borrower and a mortgage to a debt protection or cancellation service provider.

16. The method of claim 13, further comprising loading the debt protection or cancellation product information and associated loan information into a servicing system.

17. The method of claim 13, further comprising offering the debt protection or cancellation product to the borrower at selected times between applying for the mortgage and closing.

18. The method of claim 13, further comprising offering the debt protection and cancellation product via one of a non-integrated point of sale, a semi-integrated point of sale and an integrated point of sale.

19. The method of claim 13, wherein providing the addendum for the debt protection or cancellation product comprises presenting the addendum for printing from a web site of a debt protection or cancellation service provider.

20. The method of claim 13, further comprising transferring a liability to pay a claim on the debt protection or cancellation product to an insurer.

21. The method of claim 13, further comprising integrating a debt protection or cancellation product process with a mortgage process of a lending institution.

22. A system for debt protection or cancellation, comprising:
 a server; and
 a debt protection or cancellation program operable on the server to offer a debt protection or cancellation product for a mortgage at the same time the mortgage is being set up for a borrower, the debt protection or cancellation product being provided as an addendum to the mortgage so that the debt protection or cancellation product is part of the mortgage in response to the borrower accepting the debt protection or cancellation product, wherein the debt protection or cancellation program operable on the server is further configured to provide a waiver for the debt protection or cancellation product for inclusion in closing documentation in response to the borrower rejecting the debt protection or cancellation product, the debt protection or cancellation product allowing for cancelling at least a portion of the mortgage so that the at least a portion of the mortgage is no longer owed in response to a triggering event occurring.

23. The system of claim 22, further comprising actuarial information to establish pricing for the debt protection or cancellation product.

24. The system of claim 22, further comprising means to transfer any liability related to claims associated with the debt protection or cancellation product.

25. The system of claim 22, wherein the debt protection or cancellation program is adapted to create an addendum for the debt protection or cancellation product for inclusion in a debt instrument in response to an indication that a borrower wants to purchase the debt protection or cancellation product.

26. The system of claim 22, further comprising means for providing a quote for the debt protection or cancellation product in response to selected information associated with a borrower and the mortgage.

27. The system of claim 22, further comprising a debt protection or cancellation service system to service the debt protection or cancellation product.

28. The system of claim 22, further comprising a data source to log debt protection or cancellation product information and associated loan information in response to closing the mortgage with a debt protection or cancellation addendum.

29. A system for debt protection and cancellation, comprising:
 means for providing an addendum for a debt protection or cancellation product for inclusion in a mortgage at the same time the mortgage is being offered to the borrower in response to the borrower accepting the debt protection or cancellation product, the debt protection or cancellation product being a part of a mortgage and allowing for cancelling at least a portion of the mortgage so that the at least a portion of the mortgage is no longer owed in response to a triggering event occurring;
 means for providing a waiver for the debt protection or cancellation product for inclusion in closing documentation in response to the borrower rejecting the debt protection or cancellation product; and
 means for servicing the debt protection or cancellation product in response to a borrower purchasing the debt protection or cancellation product so that the debt protection or cancellation product is part of the mortgage, the servicing comprising cancelling at least a portion of the mortgage so that the at least a portion of the mortgage is no longer owed in response to a triggering event.

30. The system of claim 29, further comprising means for providing a quote for the debt protection or cancellation product.

31. The system of claim 29, further comprising means for loading debt protection or cancellation product information and associated loan information into a debt protection or cancellation service system.

32. A non-transitory computer-readable storage medium having computer-executable program tangibly embodied therein for performing a method, the method comprising:
 providing an addendum for a debt protection or cancellation product for inclusion in a debt instrument related to a mortgage at the same time the mortgage is being offered to a borrower in response to the borrower accepting the debt protection or cancellation product, such that the debt protection or cancellation product is part of the mortgage, the debt protection or cancellation product being a part of a mortgage and allowing for cancelling at least a portion of the mortgage so that the at least a portion of the mortgage is no longer owed in response to a triggering event occurring;
 providing a waiver for the debt protection or cancellation product for inclusion in closing documentation in response to the borrower rejecting the debt protection or cancellation product; and
 servicing the debt protection or cancellation product in response to a borrower purchasing the debt protection or cancellation product, the servicing comprising cancelling at least a portion of the mortgage so that the at least a portion of the mortgage is no longer owed in response to a triggering event.

33. The non-transitory computer-readable storage medium having computer-executable program tangibly embodied therein for performing a method of claim 32, the method further comprising providing a quote for the debt protection or cancellation product in response to accessing a web site of a debt cancellation service provider and entering selected borrower and loan information.

34. The non-transitory computer-readable storage medium having computer-executable program tangibly embodied therein for performing a method of claim 32, the method further comprising storing the debt protection or cancellation product information and associated loan information for serving the debt protection or cancellation product.

35. The non-transitory computer-readable storage medium having computer-executable program tangibly embodied therein for performing a method of claim 32, the method further comprising storing selected information associated with the borrower and a loan to facilitate providing the addendum for the debt protection and cancellation product.

* * * * *